United States Patent [19]

Schmidt

[11] 3,917,672

[45] Nov. 4, 1975

[54] HYDROXYBENZOYLALKANOIC ACID ESTERS

[75] Inventor: Andreas Schmidt, Reinach, Switzerland

[73] Assignee: Ciba-Geigy Corporation, Ardsley, N.Y.

[22] Filed: Aug. 6, 1973

[21] Appl. No.: 385,939

[30] Foreign Application Priority Data

Aug. 17, 1972 Switzerland................... 12196/72

[52] U.S. Cl. ............... 260/473 S; 99/163; 252/406; 252/407; 260/45.85 B; 260/327 M; 260/470
[51] Int. Cl.² ........................................ C07C 69/76
[58] Field of Search.................. 260/473 S, 45.85 B

[56] References Cited
UNITED STATES PATENTS

| | | | |
|---|---|---|---|
| 3,515,731 | 6/1970 | Conover.......................... | 260/473 S |
| 3,549,663 | 12/1970 | Conover et al.................. | 260/473 S |

*Primary Examiner*—John F. Terapane
*Attorney, Agent, or Firm*—Charles W. Vanecek

[57] ABSTRACT

Esters of hydroxybenzoylcarboxylic acid are new stabilizers for organic materials. They are prepared by reacting a corresponding acid with an alkohol in the presence of a catalyst.

6 Claims, No Drawings

HYDROXYBENZOYLALKANOIC ACID ESTERS

The present invention relates to new compounds, the method for their manufacture, their use for stabilising organic material, and the materials stabilised with their aid.

The new compounds correspond to the general formula I

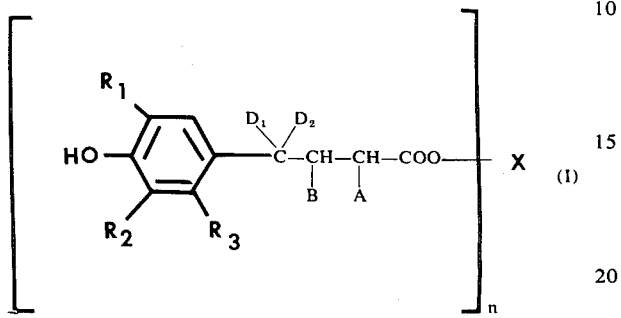

in which $R_1$ and $R_2$ independently of one another denote a primary or secondary alkyl group with 1–5 carbon atoms or a cycloalkyl group with 6–8 carbon atoms, $R_3$ denotes hydrogen or methyl, A denotes hydrogen, alkylmercapto with 1–18 carbon atoms, carbalkoxyalkylmercapto with 3–21 carbon atoms or, if $n=1$ and B denotes hydrogen, also the group

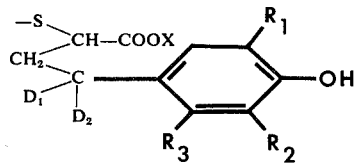

B denotes hydrogen or A and B together denote an additional direct bond or together with the carbon atoms bonded directly to A and B denote a saturated ring with 5–7 carbon atoms, $D_1$ and $D_2$ together denote the groups = O or, if A and B denote hydrogen, also

X denotes a straight-chain, branched or cyclic alkyl group with 1–18 carbon atoms, aralkyl with 7–9 carbon atoms, thiaalkyl with 3–20 carbon atoms, the oxygen of the carboxyl group in the formula I being bonded to a carbon atom in the thiaalkyl radical which carries no further hetero-atoms, alkylene with 2 – 18 carbon atoms, oxaalkylene with 4 – 18 carbon atoms with the oxygen of the carboxyl group in the formula I being bonded to a carbon atom in the oxaalkylene which does not carry any further hetero-atoms, thiaalkylene with 4 – 18 carbon atoms, with the oxygen of the carboxyl group in the formula I being bonded to a carbon atom in the thiaalkylene which does not carry any further hetero-atoms, or a 3-valent hydrocarbon radical with 3 – carbon atoms, with not more than one bond to the carboxyl groups leading from one and the same carbon atom, or a 4-valent hydrocarbon radical with 4 – 10 carbon atoms, with not more than one bond to the carboxyl groups leading from the same carbon atom, or a group

-CH₂-⟨H⟩-CH₂-

-CH₂CH₂-O-⟨⟩-C(CH₃)₂-⟨⟩-O-CH₂CH₂-

-CH₂CH₂-O-⟨⟩-SO₂-⟨⟩-OCH₂CH₂-

-CH₂CH₂-O-⟨⟩-O-CH₂CH₂-

-(CH₂)$_{m_1}$-⟨⟩-(CH₂)$_{m_2}$ wherein $m_1$ and $m_2$ are 1, 2 or 3, and $n$ denotes 1, 2, 3 or 4.

It has been found, surprisingly, that the compounds of the formula I are very suitable for stabilising organic material against thermo-oxidative degradation.

In the definition of the compounds of the formula I, X can be a straight-chain or branched alkyl group with 1–18 carbon atoms. This group can be, for example, methyl, ethyl, iso-propyl, n-butyl, sec.-butyl, tert.-butyl, n-amyl, sec.-amyl, tert.-amyl, n-hexyl, 2-ethylhexyl, n-octyl, decyl, dodecyl, tetradecyl, hexadecyl or octadecyl. $R_1$ and $R_2$ can denote a primary or secondary alkyl group with 1–5 carbon atoms which is, for example, methyl, ethyl, iso-propyl, n-butyl, sec.-butyl, n-amyl or sec.-amyl. $R_1$, $R_2$, X and/or A and B together with the carbon atoms bonded directly to A and B can also denote a cycloalkyl group which is within the indicated limits, for example cyclohexyl, α-methylcyclohexyl or cyclooctyl. A can also be an alkylmercapto group. Examples of such radicals are, within the indicated limits, methylmercapto, ethylmercapto, butylmercapto, octylmercapto and dodecylmercapto.

If A denotes carbalkoxyalkylmercapto, it can be carbomethoxymethylmercapto, carbobutoxymethylmercapto, carbo-2-ethylhexoxymethylmercapto, carbocyclohexyloxymethylmercapto, carbo-dodecyloxymethylmercapto, carbo-octadecyloxymethylmercapto, carbomethoxyethylmercapto or carbo-2-ethylhexoxyethylmercapto.

If X denotes aralkyl, it can be benzyl or α-phenylethyl. If X denotes thiaalkyl, it can be 3-thiapentyl, 3-thiaheptyl, 3-thiaundecyl, 3-thiapentadecyl, 3-thianonadecyl, 4-thiapentyl or 4-thiadecyl.

If X in the definition of the formula I is alkylene, it can be, for example, ethylene, propylene, trimethylene, tetramethylene, hexamethylene, octamethylene, decamethylene or octadecamethylene. X is oxaalkylene can denote the divalent radical of 3-oxapentane, 3-oxaheptane, 3-oxaundecane or 3-oxapentadecane and X as thiaalkylene can denote the divalent radical of 3-thiapentane, 3-thiaheptane, 3-thiaundecane, 3-thiapentadecane, 3-thianonadecane or 4-thiadecane.

X can also be a 3-valent hydrocarbon radical such as, for example, a 3-valent radical of an alkane such as

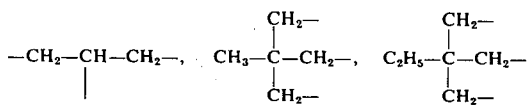

or a 4-valent hydrocarbon radical, for example a 4-valent radical of an alkane such as

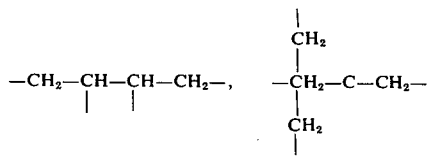

Preferred compounds of the formula I are those in which $R_1$ and $R_2$ independently of one another denote a primary or secondary alkyl group with 1 to 4 carbon atoms, particularly preferentially methyl, isopropyl or sec.-butyl, $R_3$ denotes hydrogen, A denotes hydrogen, alkylmercapto with 1–18, especially preferentially 4 – 12, carbon atoms or, if $n = 1$ and B denotes hydrogen, also the group

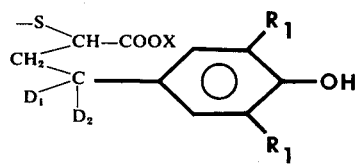

B denotes hydrogen, $D_1$ and $D_2$ together denote the group = O or, if A denotes hydrogen, —S—$CH_2$—$CH_2$—S—, A and B together denote an additional direct bond or together with the carbon atoms directly bonded to A and B denote the cyclohexane ring, X denotes a straight-chain, branched or cyclic alkyl group with 1–18 carbon atoms, aralkyl with 7–9 carbon atoms, thiaalkyl with 3–20, particularly preferentially 4–14, carbon atoms, with the oxygen of the carboxyl group being bonded to a carbon atom in the thiaalkyl which does not carry any further hetero-atoms, alkylene with 2–18, particularly preferentially 5 or 6, carbon atoms, or thiaalkylene with 4–18 carbon atoms, with the oxygen of the carboxyl group being bonded to a carbon atom in the thiaalkylene which does not carry any further hetero-atoms, and $n$ denotes 1 or 2.

The compounds of the formula I can be manufactured in various ways, for example by reaction of $n$ mols of a carboxylic acid of the formula II

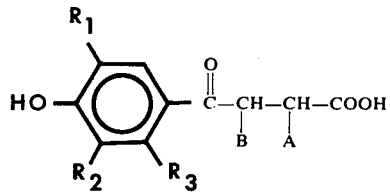

with one mol of a monohydroxy compound or polyhydroxy compound of the formula III $$X-(OH)_n \qquad (III)$$

in the presence of an acid catalyst.

The symbols $R_1$, $R_2$, $R_3$, A, B, X and n in the formulae II and III have the meaning indicated under the formula I.

Acid catalysts used are, for example, anhydrous hydrochloric acid, concentrated sulphuric acid, toluenesulphonic acid and the like.

Aliphatic or aromatic hydrocarbons, such as benzine fractions, benzene, toluene or xylene can be used as solvents. If a lower monohydric aliphatic alcohol is employed as the compound of the formula III, the latter can also serve directly as the solvent.

A further possible way of manufacturing compounds of the formula I is the reaction of one mol of a compound of the formula IV

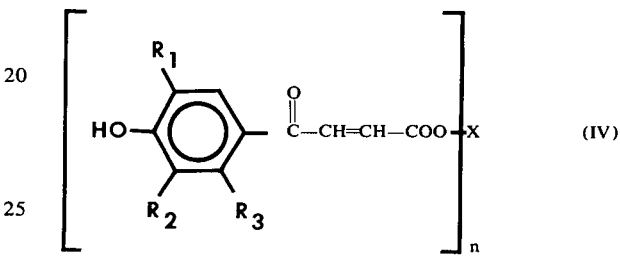

in which $R_1$, $R_2$, $R_3$, X and n have the meaning indicated under the formula I, with n mols of a mercaptan of the formula V $$A - H \qquad (V)$$

with A denoting alkylmercapto or, if $n=1$, with half a mol of $H_2S$. The latter procedure leads to compounds in which A denotes

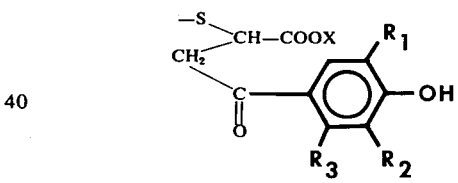

The reactions are carried out in the presence of a basic catalyst such as, for example, tertiary amines such as trimethylamine, triethylamine, pyridine and the like, or alkali metal salts of lower carboxylic acids such as sodium acetate, potassium acetate or the corresponding propionates or butyrates.

If $n$ denotes 1, the solvents used are lower alcohols, preferably the alcohol of the formula X—OH present as an ester in the compound of the formula IV.

Finally, compounds of the formula I, in which $D_1$ and $D_2$ together denote the group

and A and B denote hydrogen, are obtained by reacting 1 mol of a compound of the formula VI

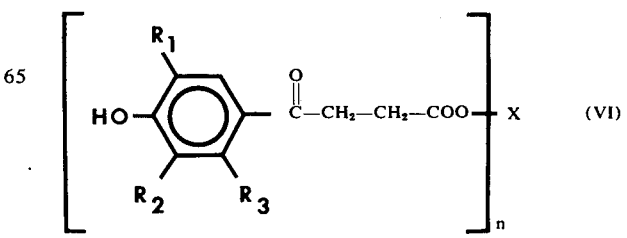

with n mols of ethanedithiol in the presence of an acid catalyst.

The symbols $R_1$, $R_2$, $R_3$, X and n have the meaning indicated under the formula I. Acid catalysts used are, for example, anhydrous hydrochloric acid, concentrated sulphuric acid, p-toluenesulphonic acid and the like. The solvents can be aliphatic or aromatic hydrocarbons such as benzine fractions, benzene, toluene, xylene and the like.

The carboxylic acids of the formula II

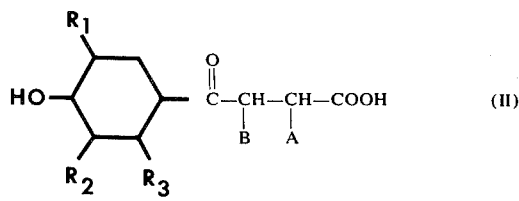

required as starting compounds, in which $R_1$ and $R_2$ independently of one another denote a primary or secondary alkyl group with 1 – 5 carbon atoms or a cycloalkyl group with 6 – 8 carbon atoms, $R_3$ denotes hydrogen or methyl, A denotes hydrogen or alkylmercapto, B denotes hydrogen or A and B together denote an additional direct bond or with the carbon atoms directly bonded to A and B denote a saturated, carbocyclic ring with 5 – 7 carbon atoms, are obtained by reacting one mol of a compound of the formula VII

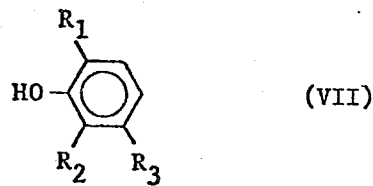

with one mol of a compound of the formula VIII

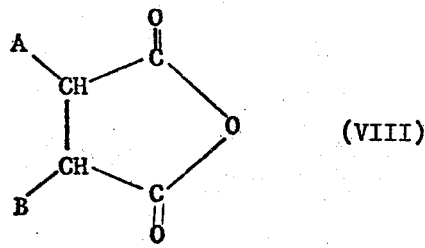

in the presence of at least two mols of an anhydrous metal halide, relative to the compound of the formula VIII, in a solvent suitable for Friedel-Crafts reactions.

Aluminum chloride, aluminum bromide, zinc chloride, iron-(III) chloride, tin-(IV) chloride or titanium-(IV) chloride are advantageously used as anhydrous metal halides.

Examples of possible solvents are nitrobenzene, carbon disulphide, hexane, heptane, ligroin, carbon tetrachloride, methylene chloride or ethylene chloride.

Compounds of the formula II, in which A and B denote hydrogen, can also be obtained by reacting a compound of the formula II, wherein A and B form an additional direct bond, with zinc dust in a lower carboxylic acid, preferably acetic acid.

Compounds of the formula II, in which A denotes thioalkyl and B denotes hydrogen, can also be prepared by reaction of a compound of the formula II wherein A and B form an additional direct bond, with a mercaptan of the formula V $$A — H \qquad (V)$$

in the presence of at least one mol of a tertiary amine such as, for example, trimethylamine, triethylamine or pyridine, in a lower alcohol, such as methanol, ethanol or isopropanol, as the solvent.

The compounds of the formula IV required as starting materials are prepared from compounds of the formula II, in which A and B together denote an additional direct bond, by reaction with compounds of the formula III.

The compounds of the formula VI required as starting materials are prepared from compounds of the formula II, in which A and B denote hydrogen, by reaction with compounds of the formula III.

The following compounds of the formula I, for example, display particularly good stabilising properties: 3-Thiapentadecan-1-ol-[3-(3,5-dimethyl-4-hydroxybenzoyl)-propionate], 1,6-hexanediol-di-[3-(3,5-dimethyl-4-hydroxybenzoyl)-propionate], neopentyl glycol-di-[3-(3,5-dimethyl-4-hydroxybenzoyl)-propionate, 2,4-di-(4-hydroxy-3,5-dimethylbenzoylmethyl)-3-thiaglutaric acid butyl ester, 2-(2-carbooctadecoxy-ethyl)-2-(4- hydroxy-3,5-dimethyl-phenyl)-1,3-dithiolane, 2-(2-carbooctadecoxy-ethyl)-2-(4-hydroxy-3,5-diisopropylphenyl)-1,3-dithiolane and 2-carbobutoxymethylmercapto-3-(4-hydroxy-3,5-di-isopropylbenzoyl)-propionic acid octadecyl ester.

The compounds of the formula I are used as stabilisers for organic substrates. As such it is possible to use, for example:

1. Polymers which are derived from hydrocarbons with single or double unsaturation, such as polyolefines, such as, for example, polyethylene, which can optionally be crosslinked, polypropylene, polyisobutylene, polymethylbutene-1, polymethylpentene-1, polybutene-1, polyisoprene, polybutadiene, polystyrene, polyisobutylene, copolymers of the monomers on which the homopolymers mentioned are based, such as ethylene-propylene copolymers, propylene-butene-1 copolymers, propylene-isobutylene copolymers, styrene-butadiene copolymers and terpolymers of ethylene and propylene with a diene, such as, for example, hexadiene, dicyclopentadiene or ethylidene-norbornenes, mixtures of the abovementioned homopolymers, such as, for example, mixtures of polypropylene and polyethylene, polypropylene and polybutene-1, or polypropylene and polyisobutylene.

2. Vinyl polymers containing halogen, such as polyvinyl chloride, polyvinylidene chloride, polyvinyl fluoride, but also polychloroprene and chlorinated rubbers.

3. Polymers which are derived from $\alpha,\beta$-unsaturated acids and their derivatives, such as polyacrylates and polymethacrylates, polyacrylamides and polyacrylonitrile, as well as their copolymers with other vinyl compounds, such as acrylonitrile/butadiene/styrene, acrylonitrile/styrene and acrylonitrile/styrene/acrylic ester copolymers.

4. Polymers which are derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyral, polyallyl phthalate, polyallyl melamine and their copolymers with other vinyl compounds, such as ethylene/vinyl acetate copolymers.

5. Homopolymers and copolymers which are derived from epoxides, such as polyethylene oxide or the polymers which are derived from bis-glycidyl ethers.

6. Polyacetals, such as polyoxymethylene and polyoxyethylene, as well as those polyoxymethylenes which contain ethylene oxide as the comonomer.

7. Polyphenylene oxides.

8. Polyurethanes and polyureas.

9. Polycarbonates.

10. Polysulphones.

11. Polyamides and copolyamides which are derived from diamines and dicarboxylic acids and/or from aminocarboxylic acids or the corresponding lactams, such as polyamide 6, polyamide 6/6, polyamide 6/10, polyamide 11 and polyamide 12.

12. Polyesters which are derived from dicarboxylic acids and dialcohols and/or from hydroxycarboxylic acids or the corresponding lactones, such as polyethylene glycol terephthalate or poly-1,4-dimethylolcyclohexane terephthalate.

13. Crosslinked polymers which are derived from aldehydes on the one hand and phenols, ureas and melamines on the other, such as phenol-formaldehyde, urea-formaldehyde and melamine-formaldehyde resins.

14. Alkyd resins, such as glycerine-phthalic acid resins and their mixtures with melamine-formaldehyde resins.

15. Unsaturated polyester resins which are derived from copolyesters of saturated and unsaturated dicarboxylic acids with polyhydric alcohols, with vinyl compounds as crosslinking agents, and also their halogen-containing modifications of low inflammability.

16. Natural polymers such as cellulose, rubber, proteins and their polymer-homologously chemically modified derivatives, such as cellulose acetates, cellulose propionates and cellulose butyrates, or the cellulose ethers, such as methylcellulose.

17. High molecular monomeric substances, for example mineral oils, animal and vegetable fats, oils and waxes, or oils, waxes and fats based on synthetic esters.

The compounds of the formula I are incorporated into the substrates in a concentration of 0.01 to 5% by weight calculated relative to the material to be stabilised.

Preferably, 0.03 to 2.0, and particularly preferentially 0.03 to 1.0, % by weight of the compounds, calculated relative to the material to be stabilised, are incorporated into the latter. The incorporation can take place before, during or after the polymerisation, for example by mixing in at least one of the compounds of the formula I and optionally further additives according to the methods customary in the art, before or during shaping, or by applying the dissolved or dispersed compounds to the polymer, if appropriate with subsequent evaporation of the solvent.

In the case of crosslinked polyethylene, the compounds are added before crosslinking.

As further additives together with which the stabilisers can be employed, there should be mentioned;

1. Antioxidants of the aminoaryl and hydroxyaryl series. Amongst the latter, the sterically hindered phenol compounds of the following categories should be mentioned:

A. Simple 2,6-dialkylphenols such as, for example, 2,6-ditert.butyl-4-methylphenol, 2-tert.butyl-4,6-dimethylphenol, 2,6-ditert.butyl-4-methoxymethylphenol and 2,6-dioctadecyl-4-methylphenol.

B. Derivatives of alkylated hydroquinones such as, for example, 2,5-ditert.butyl-hydroquinone, 2,5-ditert.amyl-hydroquinone, 2,6-ditert.butyl-hydroquinone, 2,5-ditert.butyl-4-hydroxy-anisole, 3,5-ditert.butyl-4-hydroxy-anisole and tris-(3,5-ditert.butyl-4-hydroxyphenyl)-phosphite.

C. Hydroxylated thiodiphenyl ethers such as, for example, 2,2'-thio-bis-(6-tert.butyl-4-methylphenol), 2,2'-thio-bis-(4-octylphenol), 4,4'thio-bis-(6-tert.butyl-3-methylphenol), 4,4'-thio-bis-(3,6-di-sec.amylphenol) and 4,4'-thio-bis-(6-tert.butyl-2-methylphenol).

D. Alkylidene-bisphenols such as, for example, 2,2'-methylene-bis-(6-tert.butyl-4-methylphenol), 2,2'-methylene-bis-(6-tert.butyl-4-ethylphenol), 4,4'-methylene-bis-(6-tert.butyl-2-methylphenol), 4,4'-methylene-bis-(2,6-ditert.butylphenol), 2,6-di-(3-tert.butyl-5-methyl-2-hydroxybenzyl)-4-methylphenol, 2,2'-methylene-bis-[4-methyl-6-($\alpha$-methylcyclohexyl)-phenol], 1,1-bis-(3,5-dimethyl-2-hydroxyphenylbutane), 1,1-bis-(5-tert.butyl-4-hydroxy-2-methylphenyl)-butane, 2,2-bis-(5-tert.butyl-4-hydroxy-2-methylphenyl)-butane, 2,2-bis-(3,5-di-tert.butyl-4-hydroxyphenyl)-propane, 1,1,3-tris-(5-tert.butyl-4-hydroxy-2-methylphenyl)-butane, 2,2-bis-(5-tert.butyl-4-hydroxy-2-methylphenyl)-4-n-dodecylmercaptobutane, 1,1,5,5-tetra-(5-tert.butyl-4-hydroxy-2-methylphenyl)-pentane and ethylene-glycol-bis-[3,3-bis-(3'-tert.butyl-4'-hydroxyphenyl)-butyrate].

E. O-, N- and S-benzyl compounds such as, for example, 3,5,3',5'-tetra-tert.butyl-4,4'-dihydroxydibenzyl ether, 4-hydroxy-3,5-dimethylbenzyl-mercaptoacetic acid octadecyl ester, tri-(3,5-di-tert.butyl-4-hydroxybenzyl)-amine and bis-(4-tert.butyl-3-hydroxy-2,6-dimethylbenzyl)-dithiol terephthalate.

F. Hydroxybenzylated malonic esters such as, for example, 2,2-bis-(3,5-di-tert.butyl-2-hydroxybenzyl)-malonic acid dioctadecyl ester, 2-(3-tert.butyl-4-hydroxy-5-methylbenzyl)-malonic acid dioctadecyl ester. 2,2-bis-(3,5-di-tert.butyl-4-hydroxybenzyl)-malonic acid didodecylmercapto ethylester and 2,2-bis-(3,5-di-tert.butyl-4-hydroxybenzyl)-malonic acid di-(4-tert.octylphenyl) ester.

G. Hydroxybenzyl-aromatics such as, for example, 1,3,5-tri-(3,5-di-tert.butyl-4-hydroxybenzyl)-2,4,6-trimethylbenzene, 1,4-di-(3,5-di-tert.butyl-4-hydroxybenzyl)-2,3,5,6-tetramethylbenzene and 2,4,6-tri-(3,5-di-tert.butyl-4-hydroxybenzyl)-phenol.

H. s-Triazine compounds such as, for example, 2,4-bis-octylmercapto-6-(3,5-di-tert.butyl-4-hydroxyanilino)-s-triazine, 2-octylmercapto-4,6-bis-(3,5-di-tert.butyl-4-hydroxy-anilino)-s-triazine, 2-octylmercapto-4,6-bis-(3,5-di-tert.butyl-4-hydroxy-phenoxy)-s-triazine, 2,4,6-tris-(3,5-di-tert.butyl-4-hydroxyphenoxy)-s-triazine, 2,4,6-tris-(3,5-di-tert.butyl-4-hydroxyphenylethyl)-s-triazine and 1,3,5-tris-(3,5-di-tert.butyl-4-hydroxybenzyl)-isocyanurate.

I. Amides of 3,5-di-tert.butyl-4-hydroxyphenylpropionic acid such as, for example, 1,3,3-tri-(3,5-di-tert.butyl-4-hydroxyphenyl-propionyl)-hexahydro-s-triazine and N,N'-di-(3,5-di-tert.butyl-4-hydroxyphenyl-propionyl)-hexamethylenediamine.

K. Esters of 3,5-di-tert.butyl-4-hydroxyphenyl-propionic acid with monohydric or polyhydric alcohols, such as, for example, methanol, ethanol, octadecanol; 1,6-hexanediol; 1,9-nonanediol, ethylene glycol; 1,2-propanediol, diethylene glycol, thiodiethylene glycol, neopentyl glycol, 3-thiaundecanol, 3-thiapentadecanol, trimethylhexanediol, trimethyl-olethane, trimethylolpropane, tris-hydroxyethyl-isocyanurate, 4-hydroxymethyl-1-phospha-2,6,7-trioxabicyclo[2,2,2]octane and pentaerythritol.

L. Esters of 5-tert.butyl-4-hydroxy-3-methylphenyl-propionic acid with monohydric or polyhydric alcohols such as, for example, methanol, ethanol, octadecanol; 1,6-hexanediol; 1,9-nonanediol, ethylene glycol; 1,2-propanediol, diethylene glycol, thiodiethylene glycol, neopentyl glycol, 3-thia-undecanol, 3-thia-pentadecanol, trimethylhexanediol, tri-trimethylolethane, trimethylolpropane, trishydroxyethylisocyanurate and 4-hydroxymethyl-1-phospha-2,6,7-trioxa-bicyclo[2,2,2]octane.

M. Esters of 3,5-ditert.butyl-4-hydroxyphenylacetic acid with monohydric or polyhydric alcohols such as, for example, methanol, ethanol, octadecanol; 1,6-hexanediol; 1,9-nonanediol, ethylene glycol, 1,2-propanediol, diethylene glycol, thiodiethylene glycol, neopentyl glycol, 3-thia-undecanol, 3-thia-pentadecanol, trimethylhexanediol, trimethylolethane, trimethylolpropane, tris-hydroxyethylisocyanurate and 4-hydroxymethyl-1-phospha-2,6,7-trioxabicyclo[2,2,2]octane.

N. Acylaminophenols such as, for example, N-(3,5-di-tert.butyl-4-hydroxyphenyl)-stearic acid amide and N,N'-di-(3,5-ditert.butyl-4-hydroxyphenyl)-thio-bis-acetamide.

O. Benzylphosphonates such as, for example, 3,5-ditert.butyl-4-hydroxybenzyl-phosphonic acid dimethyl ester, 3,5-di-tert.butyl-4-hydroxybenzyl-phosphonic acid diethyl ester, 3,5-ditert.butyl-4-hydroxybenzyl-phosphonic acid dioctadecyl ester and 5-tert.butyl-4-hydroxy-3-methylbenzyl-phosphonic acid dioctadecyl ester.

Amongst the aminoaryl derivatives there should be mentioned aniline and naphthylamine derivatives as well as their heterocyclic derivatives, for example: Phenyl-1-naphthylamine, phenyl-2-naphthylamine, N,N'-diphenyl-p-phenylenediamine, N,N'-di-2-naphthyl-p-phenylenediamine, N,N'-di-sec.butyl-p-phenylenediamine, 6-ethoxy-2,2,4-trimethyl-1,2-dihydroquinoline, 6-dodecyl-2,2,4-trimethyl-1,2-dihydroquinoline, monooctyliminodibenzyl and dioctyliminodibenzyl and polymerised 2,2,4-trimethyl-1,2-dihydroquinoline.

2. UV absorbers and light protection agents such as:
a. 2-(2'-Hydroxyphenyl)-benztriazoles, for example the 5'-methyl, 3',5'-di-tert.butyl-, 5'-tert.butyl-, 5-chloro-3'-, 5'-tert.butyl-, 5-chloro-3'-tert.butyl-5'-methyl-, 3'sec.butyl-5'-tert.butyl-, 3'-[α-methyl-benzyl]-5'-methyl-, 3'-[α-methylbenzyl]-5'-methyl-5-chloro-, 4'-octoxy-, 3',5'-di-tert.amyl-, 3'-methyl-5'-carbomethoxyethyl- and 5-chloro-3',5'-di-tert.amyl-derivative.

b. 2,4-Bis-(2'-hydroxyphenyl)-6-alkyl-s-triazines, for example the 6-ethyl- or 6-undecyl-derivative.

c. 2-Hydroxy-benzophenones, for example the 4-hydroxy-, 4-methoxy-, 4-octoxy-, 4-decyloxy-, 4-dodecyloxy-, 4,2',4'-trihydroxy- or 2'-hydroxy-4,4'-dimethoxy-derivative.

d. 1,3-Bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene, and 1,3-bis-(2'-hydroxy-4'-dodecyloxy-benzoyl)-benzene.

e. Aryl esters of optionally substituted benzoic acids such as, for example, phenyl salicylate, octylphenyl salicylate, di-benzoylresorcinol, bis-(4-tert.butylbenzoyl)-resorcinol, benzoylresorcinol and 3,5-di-tert.butyl-4-hydroxybenzoic acid 2,4-di-tert.butyl-phenyl ester, octadecyl ester or 2-methyl-4,6-di-tert.butyl-phenyl ester.

f. Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester and N-(β-carbomethoxy-vinyl)-2-methyl-indoline.

g. Nickel compounds, for example nickel complexes of 2,2'-thio-bis-(4-tert.octylphenol), such as the 1:1 and 1:2 complex, optionally with other ligands such as n-butylamine, nickel complexes of bis-(4-tert.octylphenyl)-sulphone, such as the 2:1 complex, optionally with other ligands such as 2-ethyl-caproic acid, nickel dibutyldithiocarbamate, nickel salts of 4-hydroxy-3,5-di-tert.butylbenzyl-phosphonic acid monoalkyl esters such as the methyl, ethyl or butyl ester, the nickel complex of 2-hydroxy-4-methyl-phenyl-undecylketonoxime and nickel 3,5-di-tert.butyl-4-hydroxy-benzoate.

h. Oxalic acid diamides, for example 4,4'-di-octyloxy oxanilide, 2,2'-di-octyloxy-5,5'-di-tert.butyl-oxanilide and 2,2'-di-dodecyloxy-5,5'-di-tert.butyl-oxanilide.

i. Sterically hindered amines, for example 4-benzoyloxy-2,2,6,6-tetramethylpiperidine, 4-stearoyloxy-2,2,6,6-tetramethylpiperidine, bis-(2,2,6,6-tetramethylpiperidyl)-sebacate and 3-n-octyl-7,7,9,9-tetramethyl-1,3,8-triazaspiro-[4,5]-decane-2,4-dione.

3. Metal deactivators, such as oxanilide, isophthalic acid dihydrazide, sebacic acid bis-phenylhydrazide, bis-benzylidene-oxalic acid dihydrazide, N,N'-diacetyladipic acid dihydrazide, N,N'-bis-salicyloyloxalic acid dihydrazide and N,N'-bis-salicyloylhydrazine.

4. Phosphites, such as triphenylphosphite, diphenylalkylphosphites, phenyldialkylphosphites, trinonylphenylphosphite, trilaurylphosphite, trioctadecylphosphite, 3,9-di-isodecyloxy-2,4,8,10-tetraoxa-3,9-diphosphaspiro-(5,5)-undecane and tri-(4-hydroxy-3,5-di-tert.butylphenyl)-phosphite.

5. Compounds which destroy peroxides, such as esters of β-thiodipropionic acid, for example the lauryl, stearyl, myrystyl or tridecyl esters, salts of 2-mercaptobenzimidazole, for example the zinc salt, and diphenylthiourea for polyolefines.

6. Polyamide stabilisers, such as copper salts in combination with iodides and/or further phosphorus compounds and salts of divalent manganese.

7. Basic co-stabilisers, such as polyvinyl pyrrolidone, melamine, benzoguanamine, triallyl-cyanurate, dicyandiamide, urea derivatives, hydrazine derivatives, amines, polyamides, polyurethanes, and alkali metal salts and alkaline earth metal salts of higher saturated or unsaturated fatty acids such as, for example, Ca stearate.

8. PVC stabilisers such as organic tin compounds, organic lead compounds and Ba/Cd salts of fatty acids.

9. Nucleating agents, such as 4-tert.butylbenzoic acid, adipic acid and diphenylacetic acid.

10. Other additives such as plasticisers, lubricants for example glycerine monostearate, emulsifiers, antistatic agents, flameproofing agents, pigments, carbon black, asbestos, glass fibres, kaolin and talc.

EXAMPLE 1

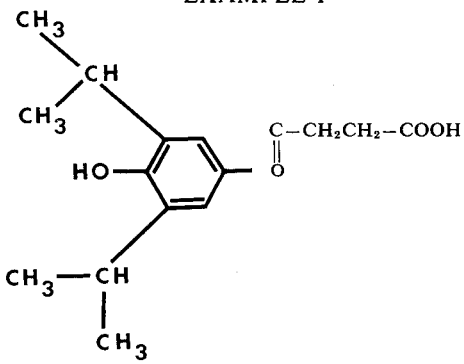

66.6 g (0.5 mol) of anhydrous aluminium chloride and 16.2 g (0.165 mol) of maleic anhydride are suspended in 200 ml of dry ethylene chloride and the mixture is stirred for 30 minutes at room temperature. Excess AlCl₃ is filtered off and the filtrate is added dropwise over the course of 15 minutes to a solution of 28.5 g (0.16 mol) of 2,6-diisopropylphenol in 100 ml of ethylene chloride, whilst cooling efficiently at 10°– 15°C. Thereafter the mixture is stirred for a further 30 minutes at room temperature and is then poured onto a mixture of 400 g of ice, 100 ml of 2 N hydrochloric acid and 300 ml of ethylene chloride.

The organic phase is separated off, washed with water until neutral, dried over CaCl₂ and subsequently evaporated to dryness. A yellow-brown oil, which crystallises in due course, is thus obtained. After recrystallisation from toluene, 33.6 g of 3-(4-hydroxy-3,5-diisopropylbenzoyl)-acrylic acid of melting point 168°–⅔°C are obtained.

If, in this example, the 2,6-diisopropylphenol is replaced by an equivalent amount of 2,6-di-sec.-butylphenol or 2,6-dimethylphenol, and otherwise the same conditions are used, 3-(3,5-di-sec.butyl-4-hydroxybenzoyl)-acrylic acid of melting point 152°C or 3-(4-hydroxy-3,5-dimethylbenzoyl)-acrylic acid of melting point 210°C are respectively obtained.

EXAMPLE 2

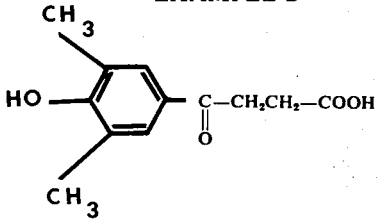

40 g (0.18 mol) of 3-(4-hydroxy-3,5-dimethylbenzoyl)acrylic acid are dissolved in 900 ml of boiling glacial acetic acid. Thereafter, 26 g (0.4 mol) of zinc dust are added in portions and the mixture is left to boil for a further 10 minutes. During this time, the initially orange-yellow solution loses its colour. The zinc acetate and undissolved zinc are filtered off hot and the filtrate is evaporated to dryness. The residue is dissolved in boiling water, insoluble matter is filtered off and the filtrate is allowed to crystallise. 30 g of 3-(4-hydroxy-3,5-dimethylbenzoyl)-propionic acid of melting point 168°C are thus obtained.

If, in this example, the 3-(4-hydroxy-3,5-dimethylbenzoyl)-acrylic acid is replaced by an equivalent amount of 3-(4-hydroxy-3,5-diisopropylbenzoyl)-acrylic acid or 3-(3,5-di-sec.butyl-4-hydroxybenzoyl)-acrylic acid, and otherwise the same conditions are used, 3-(4-hydroxy-3,5-diisopropylbenzoyl)-propionic acid of melting point 148°C or 3-(3,5-di-sec.butyl-4-hydroxybenzoyl)-propionic acid of melting point 115°C are respectively obtained.

EXAMPLE 3

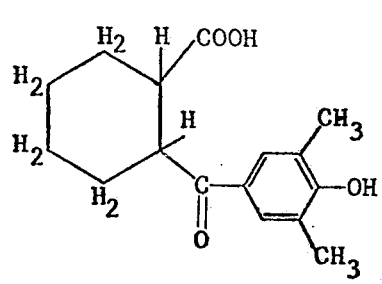

122 g (1 mol) of 2,6-dimethylphenol are dissolved in 800 ml of ethylene chloride and 267 g (2 mols) of AlCl₃ are added in portions whilst cooling (approx. 10°C). A solution of 154.2 g (1 mol) of hexahydrophthalic anhydride in 300 ml of ethylene chloride is added dropwise at 5° – 10°C over the course of 2 hours, whilst stirring well. A dark red solution forms, which is stirred for a further 10 hours at room temperature. Thereafter the solution is poured onto a mixture of 1,500 g of ice and 500 ml of concentrated hydrochloric acid and the whole is stirred for 2 hours. The bulk of the product crystallises out during this time (165 g). A further 20 g are obtained by separating off and concentrating the ethylene chloride phase.

After recrystallisation from ethylene chloride, 2-(4-hydroxy-3,5-dimethylbenzoyl)-hexahydrobenzoic acid melts at 180°C.

EXAMPLE 4

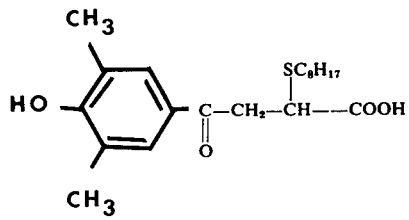

66 g (0.3 mol) of 3-(4-hydroxy-3,5-dimethyl-benzoyl)-acrylic acid and 46 g (0.315 mol) of n-octylmercaptan are dissolved in 500 ml of methanol, 33.6 g (0.3 mol) of triethylamine are added and the mixture is heated to the boil for 5 hours. After cooling, it is diluted with 250 ml of water and neutralised with concentrated hydrochloric acid, whereupon the product crystallises. It is purified by recrystallisation from a 3:2 mixture of toluene and hexane. 100 g of 2-octyl-mercapto-3-(4-hydroxy-3,5-dimethyl-benzoyl)-propionic acid of melting point 109°C are thus obtained.

If, in this example, the octylmercaptan is replaced by an equivalent amount of dodecylmercaptan, and otherwise the same conditions are used, 2-dodecylmercapto-3-(4-hydroxy-3,5-dimethylbenzoyl)-propionic acid of melting point 102°C is obtained.

EXAMPLE 5

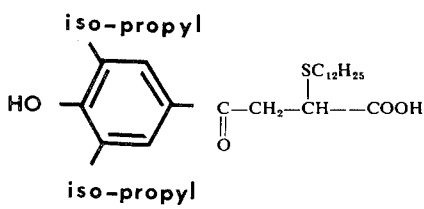

82.9 g (0.3 mol) of 3-(4-hydroxy-3,5-di-isopropyl-benzoyl)-acrylic acid and 70.5 g (0.315 mol) of dodecylmercaptan are dissolved in 600 ml of methanol, 33.6 g (0.3 mol) of triethylamine are added and the mixture is heated to the boil for 4½ hours. After cooling, it is neutralised with dilute hydrochloric acid and subsequently diluted with 400 ml of water. The oil which separates out is separated off and dissolved in hot acetonitrile. On cooling, 115 g of 2-dodecylmercapto-3-(4-hydroxy-3,5-diisopropyl-benzoyl)-propionic acid of melting point 81°C crystallise out.

If, in this example, the dodecylmercaptan is replaced by an equivalent amount of octylmercaptan or butylmercaptan and otherwise the same conditions are used, 2-octylmercapto-3-(4-hydroxy-3,5-diisopropyl-benzoyl)-propionic acid of melting point 109°C or 2-butyl-mercapto-3-(4-hydroxy-3,5-diisopropylbenzoyl)-propionic acid of melting point 141°C are respectively obtained.

EXAMPLE 6

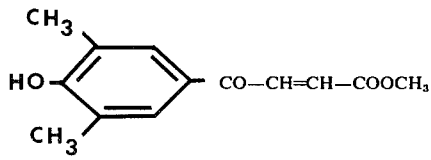

41 g (0.186 mol) of 3-(4-hydroxy-3,5-dimethyl-benzoyl)acrylic acid are dissolved in 350 ml of methanol, 2 ml of concentrated sulphuric acid are added and the mixture is heated to the boil for 30 minutes. Thereafter, 200 ml of methanol are distilled off under reduced pressure. On cooling, 3-(4-hydroxy-3,5-dimetheyl-benzoyl)-acrylic acid methyl ester (stabiliser No. 1) of melting point 142°C is obtained.

If, in the above example, the methanol is replaced by ethanol or n-butanol and the same procedure is followed, the ethyl ester (stabiliser No. 2) (melting point 128°C) or the butyl ester (stabiliser No. 3) (melting point 84°C) of 3-(4-hydroxy-3,5-dimethyl-benzoyl)-acrylic acid are respectively obtained.

EXAMPLE 7

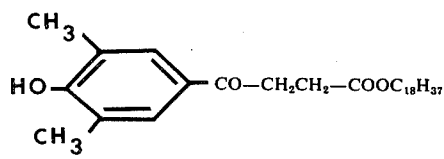

45 g (0.2 mol) of 3-(4-hydroxy-3,5-dimethyl-benzoyl)-propionic acid 59.2 g (0.22 mol) of 1-octadecanol and 5 g of p-toluenesulphonic acid are dissolved in 220 ml of hot toluene and the solution is heated to the boil under a water separator for 5 hours. After cooling, a little water is added and the precipitate is filtered off. After recrystallisation from toluene, 3-(4-hydroxy-3,5-dimethylbenzoyl)-propionic acid octadecyl ester (stabiliser No. 4) melts at 83°C.

If, in this example, the 1-octadecanol is replaced by an equimolecular amount of one of the alcohols of the table shown below and otherwise the same conditions are used, the corresponding esters of 3-(4-hydroxy-3,5-dimethyl-benzoyl)-propionic acid, having the indicated melting points, are obtained.

|  | Melting point | Stabiliser No. |
|---|---|---|
| 1-octanol | 49°C | 5 |
| 3-thia-pentadecan-1-ol | 74°C | 6 |

EXAMPLE 8

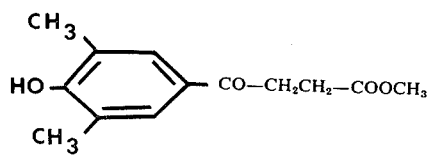

10 g (0.045 mol) of 3-(4-hydroxy-3,5-dimethylbenzoyl)-propionic acid are dissolved in 100 ml of methanol, 4 ml of concentrated sulphuric acid are added and the mixture is heated under reflux for 30 minutes. After cooling, it is neutralised with a 10% strength sodium carbonate solution and diluted with water. The resulting precipitate is filtered off and recrystallised from methanol-water mixture. 3-(4-Hydroxy-3,5-dimetheyl-benzoyl)-propionic acid methyl ester (stabiliser No. 7) melts at 114°C.

EXAMPLE 9

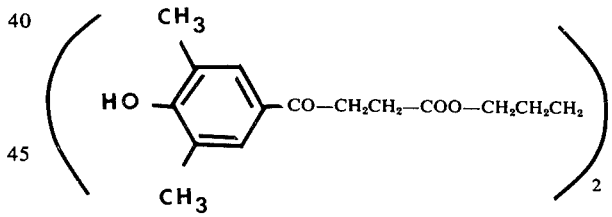

12 g (0.054 mol) of 3-(4-hydroxy-3,5-dimethyl-benzoyl)-propionic acid, 3.2 g (0.027 mol) of 1,6-hexanediol and 0.2 g of p-toluenesulphonic acid are suspended in 100 ml of toluene and the suspension is heated to the boil and kept under reflux for 4½ hours under a water separator. After cooling, the crystalline precipitate is filtered off and recrystallised from acetonitrile. 1,6-Hexanediol-di-[3-(4-hydroxy-3,5-dimethyl-benzoyl)-propionate] thus obtained (stabiliser No. 8), melts at 144°C.

If, in the above example, the hexanediol is replaced by neopentyl glycol and otherwise the same procedure is followed, the corresponding ester (stabiliser No. 9) of melting point 125°C is obtained.

EXAMPLE 10

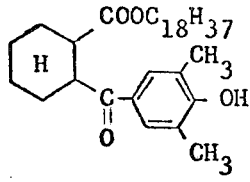

11 g (0.04 mol) of 2-(4-hydroxy-3,5-dimethylbenzoyl)-hexahydrobenzoic acid, 10.8 g (0.04 mol) of 1-octadecanol and 0.4 g of p-toluenesulphonic acid are suspended in 120 ml of toluene and the suspension is heated to the boil and kept under reflux for 1¾ hours under a water separator. After cooling, the solution is extracted with 10% strength sodium carbonate solution, washed with water until neutral and concentrated to dryness under reduced pressure. The residue is recrystallised from methanol. 2-(4-Hydroxy-3,5-dimethyl-benzoyl)-hexahydrobenzoic acid octadecyl ester thus obtained (stabiliser No. 10) melts at 66°C.

EXAMPLE 11

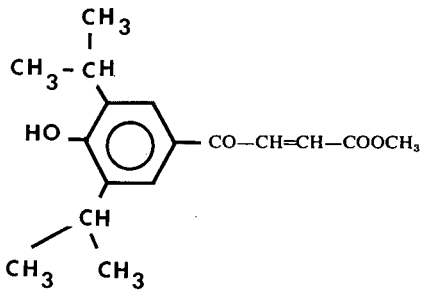

100 g (0.36 mol) of 3-(4-hydroxy-3,5-di-isopropyl-benzoyl)-acrylic acid are dissolved in 500 ml of hot methanol, 5 ml of concentrated sulphuric acid are added and the mixture is heated to the boil for 75 minutes. After cooling, it is neutralised with a 10% strength sodium bicarbonate solution, 500 ml of water are added, and the mixture is extracted with toluene. The organic phase is twice washed with water and concentrated to dryness under reduced pressure. The residue is recrystallised from cyclohexanol. 3-(4-Hydroxy-3,5-di-isopropyl-benzoyl)-acrylic acid methyl ester, thus obtained (stabiliser No. 11), melts at 116°C.

If, in the preceding example, the methanol is replaced by ethanol or n-butanol, and the same procedure is followed, the ethyl ester (stabiliser No. 12) (melting point 116°C) or the butyl ester (stabiliser No. 13) (melting point 53°C) of 3-(4-hydroxy-3,5-di-isopropyl-benzoyl)-acrylic acid are respectively obtained.

EXAMPLE 12

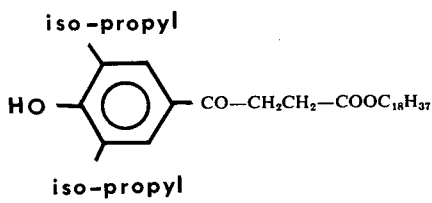

120 g (0.43 mol) of 3-(4-hydroxy-3,5-di-isopropyl-benzoyl)-propionic acid, 128 g (0.48 mol) of 1-octadecanol and 10 g of p-toluenesulphonic acid are dissolved in 450 ml of hot toluene and the solution is heated to the boil under a water separator for 2 hours. After cooling, the solution is extracted by shaking with water and the organic phase is concentrated to dryness under reduced pressure. After recrystallisation from hexane, 3-(4-hydroxy-3,5-di-isopropylbenzoyl)-propionic acid octadecyl ester (stabiliser No. 14) melts at 50°C.

If, in the preceding example, the octadecanol is replaced by 3-thiapentadecanol and the same conditions are used, 3-(4-hydroxy-3,5-di-isopropyl-benzoyl)-propionic acid 3'-thia-pentadecyl ester (stabiliser No. 15) is obtained, which is a viscous light-coloured oil at room temperature.

EXAMPLE 13

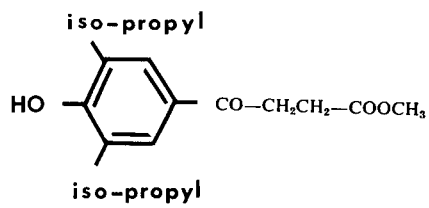

10 g (0.036 mol) of 3-(4-hydroxy-3,5-di-isopropyl-benzoyl)-propionic acid are dissolved in 50 ml of methanol, 5 ml of concentrated sulphuric acid are added and the mixture is heated for 30 minutes under reflux. After cooling, it is neutralised with a 10% strength sodium carbonate solution and further diluted with water. The organic phase is separated off with ether, dried with anhydrous sodium sulphate and concentrated to dryness. After recrystallisation from ligroin, the residue yields 3-(4-hydroxy-3,5-di-isopropylbenzoylpropionic acid methyl ester of melting point 73°C (stabiliser No. 16).

EXAMPLE 14

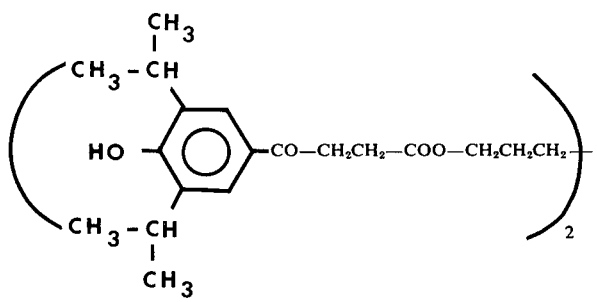

70 g (0.24 mol) of 3-(4-hydroxy-3,5-di-isopropylbenzoyl)-propionic acid, 14.6 g (0.12 mol) of 1,6-hexanediol and 0.5 g of p-toluenesulphonic acid are suspended in 150 ml of toluene and the suspension is heated to the boil and kept under a water separator for 7 hours under reflux. After cooling, the mixture is filtered and the filtrate is partially concentrated under reduced pressure. After cooling, the product is filtered off and recrystallised from toluene. 1,6-Hexanediol-bis-[3-(4-hydroxy-3,5-di-isopropyl-benzoyl)-propionate], thus obtained, melts at 109°C. (Stabiliser No. 17).

If, in the preceding example, 1,6-hexanediol is replaced by neopentyl glycol or thiodiethylene glycol and otherwise the same procedure is followed, neopentyl glycolbis-[3-(4-hydroxy-3,5-di-isopropyl-benzoyl)-propionate] (melting point 140°C, stabiliser No. 18) or thiodiethylene glycol-bis-[3-(4-hydroxy-3,5-di-isopropyl-benzoyl)-propionate] (liquid, stabiliser No. 19) are respectively obtained.

EXAMPLE 15

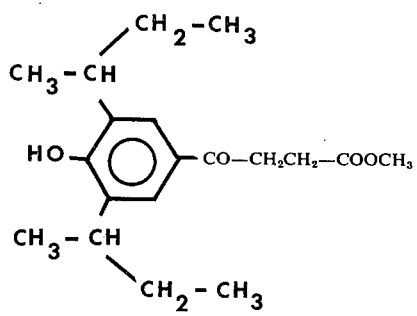

15.2 g (0.05 mol) of 3-(3,5-di-sec.-butyl-4-hydroxybenzoyl)-acrylic acid are dissolved in 60 ml of ethanol, 1.2 ml of concentrated sulphuric acid are added and the mixture is heated to the boil for 1½ hours. After cooling, it is neutralised with 10% strength sodium carbonate solution, 200 ml of water are added and the organic phase is separated off by extraction by shaking with toluene. The toluene solution is a additionally washed tiwce with water and is subsequently concentrated to dryness under reduced pressure.

3-(3,5-Di-sec.-butyl-4-hydroxybenzoyl)-acrylic acid ethyl ester remains a viscous oil at room temperature (stabiliser No. 20).

EXAMPLE 16

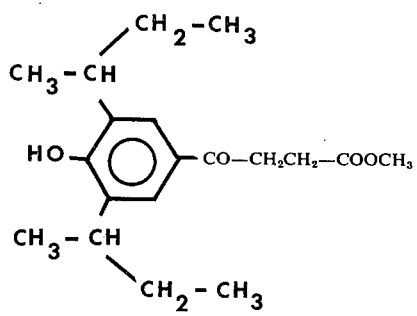

226.7 g (0.737 mol) of 3-(3,5-di-sec.-butyl-4-hydroybenzoyl)-propionic acid are dissolved in 500 ml of methanol, 10 ml of concentrated sulphuric acid are added and the mixture is heated under reflux for 30 minutes. After cooling, it is neutralised with a 10% strength sodium carbonate solution and further diluted with 500 ml of water. The organic phase is extracted with ether, twice washed with water, dried with anhydrous sodium sulphate and concentrated to dryness. 3-(3,5-Di-sec.-butyl-4-hydroxybenzoyl)-propionic acid methyl ester, thus obtained, remains a viscous oil at room temperature (stabiliser No. 21).

EXAMPLE 17

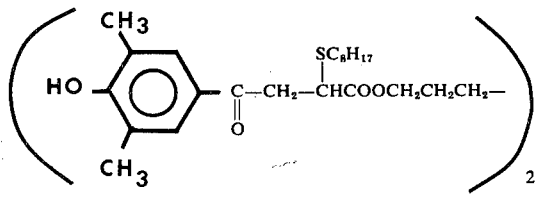

36.5 g (0.1 mol) of 2-octylmercapto-3-(4-hydroxy-3,5-dimethylbenzoyl)-propionic acid, 5.9 g (0.05 mol) of 1,6-hexanediol and 0.5 g of p-toluenesulphonic acid are dissolved in 100 ml of hot toluene and heated to the boil, under a water separator, for 5 hours. After cooling, the solution is extracted by shaking with water and the organic phase is concentrated to dryness under reduced pressure. After recrystallisation from ethanol, 1,6-hexanediol-bis-[2-octylmercapto-3-(4-hydroxy-3,5-dimethylbenzoyl)-propionate] melts at 107°C. (Stabiliser No. 22).

EXAMPLE 18

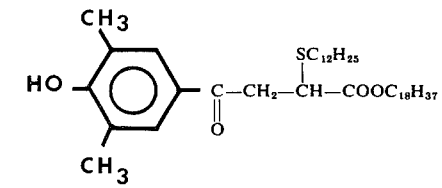

10.56 g (0.025 mol) of 2-dodecylmercapto-3-(4-hydroxy-3,5-dimethylbenzoyl)-propionic acid, 7.1 g of octadecanol (0.026 mol) and 0.5 g of p-toluenesulphonic acid are dissolved in 80 ml of hot toluene and the mixture is heated to the boil under a water separator for 2½ hours. After cooling, the solution is extracted by shaking with water and the organic phase is concentrated almost to dryness under reduced pressure. After recrystallisation from methanol, 2-dodecylmercapto-3-(4-hydroxy-3,5-dimethylbenzyl)-propionic acid octadecyl ester melts at 68°C. (Stabiliser No. 23).

If, in this example, the octadecanol is replaced by 1.5 g (0.0125 mol) of 1,6-hexanediol, and otherwise the same conditions are used, 1,6-hexanediol-bis-[2-dodecylmercapto-3-(4-hydroxy-3,5-dimethylbenzoyl)-propionate] of melting point 112°C is obtained. (Stabiliser No. 24).

EXAMPLE 19

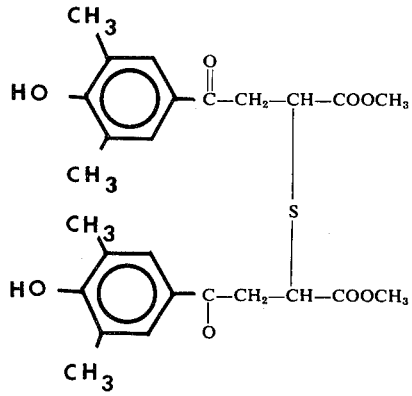

19.8 g (0.0845 mol) of 3-(4-hydroxy-3,5-dimethylbenzoyl)-acrylic acid methyl ester and 2.96 g (0.022 mol) of sodium acetate trihydrate are dissolved in 50 ml of hot methanol and hydrogen sulphide is passed in at the boil for one hour. During this time, the initially red-brown solution loses its colour and a precipitate separates out. After cooling, the precipitate is filtered off and rinsed with cold methanol. 18 g of 2,4-di-(4-hydroxy-3,5-dimethylbenzoylmethyl)-3-thia-glutaric acid dimethyl ester of melting point 264°C are thus obtained. (Stabiliser No. 25).

If, in this example, 3-(4-hydroxy-3,5-dimethylbenzoyl)-acrylic acid methyl ester is replaced by an equivalent amount of 3-(4-hydroxy-3,5-dimethylbenzoyl)-acrylic acid ethyl ester or n-butyl ester, and otherwise the same conditions are used, 2,4-di-(4-hydroxy-3,5-dimethylbenzoylmethyl)-3-thia-glutaric acid diethyl ester of melting point 226°C (stabiliser No. 26) or 2,4-di-(4-hydroxy-3,5-dimethylbenzoylmethyl)-3-thia-glutaric acid dibutyl ester of melting point 157°C (stabiliser No. 27) are respectively obtained.

EXAMPLE 20

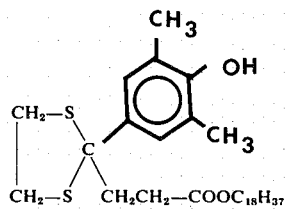

23.7 g (0.05 mol) of 3-(4-hydroxy-3,5-dimethylbenzoyl)-propionic acid octadecyl ester, 4.7 g (0.05 mol) of ethanedithiol and 0.5 g of p-toluenesulphonic acid are dissolved in 250 ml of hot benzene and heated to the boil for 2 hours under a water separator. After cooling, the solution is extracted by shaking with water and the organic phase is concentrated to dryness under reduced pressure. After recrystallisation from methanol, 2-(2-carbooctadecoxyethyl)-2-(4-hydroxy-3,5-dimethylphenyl)-1,3-dithiolane melts at 70°C (stabiliser No. 28).

If, in this example, 3-(4-hydroxy-3,5-dimethylbenzoyl)-propionic acid octadecyl ester is replaced by an equivalent amount of 1,6-hexanediol-di-[3-(4-hydroxy-3,5-dimethylbenzoyl)-propionate] and otherwise the same conditions are used, the diester of 1,6-hexanediol with 2-(2-carboxyethyl)-2-(4-hydroxy-3,5-dimethylbenzoyl)-1,3-dithiolane, of melting point 142°C, is obtained. (Stabiliser No. 29).

EXAMPLE 21

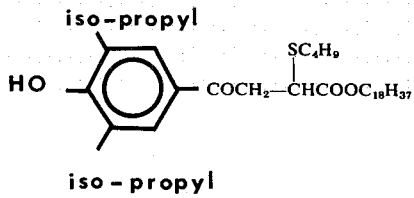

15 g (0.0408 mol) of 2-butylmercapto-3-(4-hydroxy-3,5-di-isopropylbenzoyl)-propionic acid, 11.55 g (0.0428mol) of 1-octadecanol and 0.5 g of p-toluenesulphonic acid are dissolved in 80 ml of hot toluene and the mixture is heated to the boil for 30 minutes under a water separator. After cooling, the solution is extracted by shaking with water and the organic phase is concentrated to dryness under reduced pressure. The resulting 2-butylmercapto-3-(4-hydroxy-3,5-di-isopropylbenzoyl)-propionic acid octadecyl ester can be recrystallised from acetonitrile at a low temperature. It is a liquid at room temperature (stabiliser No. 30).

EXAMPLE 22

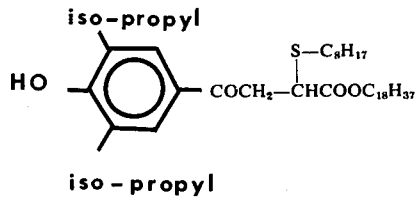

16.9 g (0.04 mol) of 2-octylmercapto-3-(4-hydroxy-3,5-di-isopropylbenzoyl)-propionic acid, 11.3 g (0.042 mol) of 1-octadecanol and 0.5 g of p-toluenesulphonic acid are dissolved in 100 ml of hot toluene and the mixture is heated to the boil under a water separator for 2 hours. After cooling, the solution is extracted by shaking with water and the organic phase is concentrated to dryness under reduced pressure. After purification using a silica gel column with methanol-toluene = 1:9 as the running agent, 2-octyl-mercapto-3-(4-hydroxy-3,5-di-isopropylbenzoyl)-propionic acid octadecyl ester is liquid at room temperature (stabiliser No. 31).

If, in this example, the 1-octadecanol is replaced by an equivalent amount of 1,6-hexanediol and otherwise the same conditions are used, 1,6-hexanediol-di-[2-octylmercapto3-(4-hydroxy-3,5-di-isopropylbenzoyl)-propionate] is obtained, which is liquid at room temperature. (Stabiliser No. 32).

EXAMPLE 23

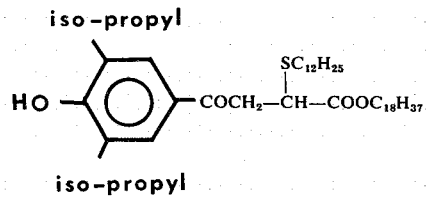

15 g (0.03 mol) of 2-dodecylmercapto-3-(4-hydroxy3,5-di-isopropylbenzoyl)-propionic acid, 8.9 g (0.033 mol) of octadecanol and 0.5 g of p-toluenesulphonic acid are dissolved in 100 ml of hot toluene and the mixture is heated to the boil, under a water separator, for 2 hours. After cooling, the solution is extracted by shaking with water and the organic phase is concentrated to dryness under reduced pressure. After recrystallisation from methanol, 2-dodecylmercapto-3-(4-hydroxy-3,5-di-isopropylbenzoyl)-propionic acid octadecyl ester melts at 53°C. (Stabiliser No. 33).

If, in this example, the octadecanol is replaced by an equivalent amount of n-butanol and otherwise the same conditions are used, 2-dodecylmercapto-3-(4-hydroxy-3,5-di-isopropylbenzoyl)-propionic acid butyl ester is obtained, which, when purified using a silica gel column with methanol: toluene = 1:9 as the running agent, is liquid at room temperature. (Stabiliser No. 34).

EXAMPLE 24

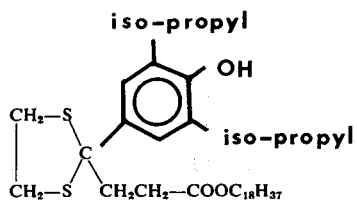

13.2 g (0.025 mol) of 3-(4-hydroxy-3,5-di-isopropylbenzoyl)-propionic acid octadecyl ester, 2.5 g (0.027 mol) of ethanedithiol and 0.5 g of p-toluenesulphonic acid are dissolved in 50 ml of hot benzene and the mixture is heated to the boil, under a water separator, for 6½ hours. After cooling, the solution is extracted by shaking with water and the organic phase is concentrated to dryness under reduced pressure. After recrystallisation from methanol, 2-(2-carbooctadecoxyethyl)-2-(4-hydroxy-3,5-di-isopropylphenyl)-1,3-dithiolane melts at 51°C. (Stabiliser No. 35).

If, in this example, 3-(4-hydroxy-3,5-di-isopropylbenzoyl)-propionic acid octadecyl ester is replaced by an equivalent amount of 1,6-hexanediol-di-[3-(4-hydroxy-3,5-di-isopropylbenzoyl)-propionate] and otherwise the same conditions are used, the diester of 1,6-hexanediol and 2-(2-carboxyethyl)-2-(4-hydroxy-3,5-di-isopropylphenyl)-1,3-dithiolane, of melting point 115°C, is obtained. (Stabiliser No. 36).

In the test examples which follow, 1,8-bis-(3,5-di-isopropyl-4-hydroxybenzyl)octane was also tested, as a previously known comparison compound.

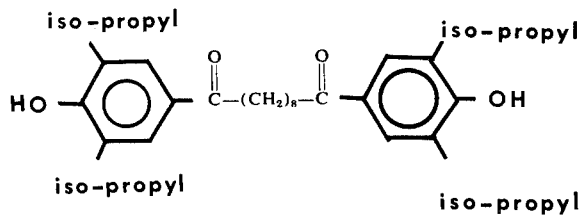

(Stabiliser No. 37).

EXAMPLE 25

100 parts of polypropylene (melt index 3.2 g/10 minutes, 230°C/2,160 g) are thoroughly mixed for 10 minutes in a shaking apparatus with 0.2 part of one of the additives listed in the table which follows.

The resulting mixtures are kneaded in a Brabender plastograph for 10 minutes at 200°C and the mass thus obtained is subsequently pressed in a sheet press at 260°C platen temperature to give 1 mm thick sheets, from which strips 1 cm wide and 17 cm long are punched.

The activity of the additives incorporated into the test strips is tested by heat aging in a circulating air oven at 135°C and 149°C, with an additive-free test strip serving for comparison. 3 test strips of each formulation are employed for the test. The end point is defined as the incipient, easily visible decomposition of the test strip. The results are quoted in days.

| Stabiliser No. | Days to reach incipient decomposition | |
|---|---|---|
| | 149°C | 135°C |
| Without additive | ½ | 1 |
| 4 | 3 | 9 |
| 6 | 23 | 71 |
| 8 | 24 | 65 |
| 9 | 19 | 61 |
| 10 | 5 | 11 |
| 14 | 3 | 9 |
| 15 | 16 | 67 |
| 17 | 3 | 17 |
| 18 | 4 | 20 |
| 19 | 3 | 14 |
| 22 | 4 | 15 |
| 23 | 4 | 29 |
| 24 | 4 | 12 |
| 25 | 4 | 11 |
| 26 | 11 | 52 |
| 27 | 20 | 40 |
| 28 | 55 | 78 |
| 29 | 6 | 47 |
| 30 | 8 | 32 |
| 31 | 5 | 26 |
| 32 | 15 | 28 |
| 33 | 7 | 23 |
| 34 | 13 | 52 |
| 35 | 57 | 97 |
| 36 | 15 | 52 |
| 37 | 1 | 6 |

EXAMPLE 26

100 parts of polypropylene (melt index 3.2 g/10 minutes, 230°C/2,160 g) are thoroughly mixed for 10 minutes in a shaking apparatus with 0.1 part of one of the additives listed in the table which follows and 0.3 part of thiodipropionic acid dilauryl ester.

The resulting mixtures are kneaded for 10 minutes in a Brabender plastograph at 200°C and the mass thus obtained is subsequently pressed in a sheet press at 260°C platen temperature to give 1 mm thick sheets, from which strips 1 cm wide and 17 cm long are punched.

The activity of the additives incorporated in the test strips is tested by heat aging in a circulating air oven at 135°C and 149°C, with a test strip which only contains 0.3 part of thiodipropionic acid dilauryl ester serving for comparison.

3 test strips of each formulation are employed. The end point is defined as the incipient, easily visible decomposition of the test strip. The results are indicated in days.

| Stabiliser No. | Days to reach incipient decomposition | |
|---|---|---|
| | 149°C | 135°C |
| Without additive | 8 | 20 |
| 4 | 35 | 130 |
| 6 | 23 | 97 |
| 8 | 26 | 92 |
| 9 | 19 | 89 |
| 10 | 21 | 77 |
| 14 | 37 | 109 |
| 15 | 22 | 104 |
| 17 | 56 | 110 |
| 18 | 25 | 101 |
| 19 | 19 | 79 |
| 22 | 24 | 98 |
| 23 | 18 | 74 |
| 24 | 32 | 96 |
| 25 | 19 | 95 |
| 26 | 18 | 84 |
| 27 | 23 | 59 |
| 28 | 55 | 110 |
| 29 | 17 | 68 |
| 30 | 18 | 74 |
| 31 | 21 | 91 |
| 32 | 25 | 70 |
| 33 | 18 | 68 |
| 34 | 21 | 84 |
| 35 | 55 | 160 |
| 36 | 28 | 95 |
| 37 | 12 | 66 |

EXAMPLE 27

Shavings (slices) 25 μ thick are cut with the aid of a microtome from the 1 mm thick test sheets described in Example 25. These slices are clamped between stainless steel grids and the sample carriers thus obtained are suspended in a circulating air oven and aged at 135°C or 147°C. The end point is defined as the time after which, on gently tapping the grid, degraded polypropylene drops out in the form of a powder (this is checked 1 - 2 × daily). The results are quoted in hours.

| Stabiliser No. | Hours to reach incipient decomposition | |
|---|---|---|
| | 147°C | 135°C |
| Without additive | 10 | 20 |
| 6 | 35 | 70 |
| 8 | 35 | 70 |
| 15 | 20 | 65 |
| 26 | 15 | 45 |
| 27 | 20 | 60 |
| 28 | 45 | 165 |
| 34 | 24 | 65 |
| 35 | 70 | 215 |
| 36 | 85 | 250 |
| 37 | 20 | 50 |

EXAMPLE 28

Shavings (slices) 25 μ thick are cut with the aid of a microtome from the 1 mm thick test sheets described in Example 26. These slices are clamped between stainless steel grids and the sample carriers thus obtained are suspended in a circulating air oven and aged at 135°C or 147°C. The end point is defined as the time after which, on gently tapping the grid, degraded polypropylene drops out in the form of a powder (this is checked 1 – 2 × daily). The results are quoted in hours.

| Stabiliser No. | Hours to reach incipient decomposition | |
|---|---|---|
| | 147°C | 135°C |
| Without additive | 10 | 20 |
| 6 | 35 | 70 |
| 8 | 40 | 165 |
| 15 | 20 | 90 |
| 26 | 65 | 190 |
| 27 | 40 | 120 |
| 28 | 65 | 210 |
| 34 | 45 | 190 |
| 35 | 70 | 260 |
| 36 | 120 | 450 |
| 37 | 15 | 55 |

EXAMPLE 29

100 parts of polypropylene (melt index 3.2 g/10 minutes, 230°C/2,160 g) are thoroughly mixed for 10 minutes in a shaking apparatus with the parts by weight of stabiliser No. 4 and thiodipropionic acid dilauryl ester indicated in the table below. The weight ratio of the stabiliser to the thiodipropionic acid dilauryl ester is kept constant at 1:3.

The resulting mixtures are kneaded for 10 minutes in a Brabender plastograph at 200°C and the mass thus obtained is subsequently pressed in a sheet press at 260°C platen temperature to give 1 mm thick sheets, from which strips 1 cm wide and 17 cm long are punched.

The activity of the additives incorporated in the test strips is tested by heat aging in a circulating air oven at 135°C and 149°C, with a test strip which only contains 0.3 part of thiodipropionic acid dilauryl ester serving for comparison.

3 test strips of each formulation are employed. The end point is defined as the incipient, easily visible decomposition of the test strip. The results are indicated in days.

| Parts by weight of stabiliser No. 4 | Parts by weight of dilauryl thiodipropionate | Additives added, total concentration | Days to reach incipient decomposition | |
|---|---|---|---|---|
| | | | 149°C | 135°C |
| 0.15 | 0.45 | 0.60 | 35 | 140 |
| 0.10 | 0.30 | 0.40 | 35 | 132 |
| 0.05 | 0.15 | 0.20 | 30 | 79 |
| 0.025 | 0.075 | 0.10 | 9 | 66 |
| 0.011 | 0.039 | 0.05 | 4 | 59 |

EXAMPLE 30

100 parts of unstabilised high pressure polyethylene powder ("Plastylene" of Messrs. Ethylene Plastique, Mazingarbe, France), are thoroughly mixed dry with 1.0 part of 1,3-bis-(tert.butylperoxyisopropyl)benzene ("Perkadox 14" of Messrs. Oxydo GmbH, Emmenrich, Federal Republic of Germany) and 0.2 part of one of the additives of the table which follows. The mixture is converted into a homogeneous mass on a friction roll mill at 110°C over the course of 10 minutes. This plastic mixture is pressed in a heat press at 260°C for 20 minutes to give 1 mm thick sheet, with crosslinking of the polymer by the added peroxide occurring under these conditions. Test specimens of size 10 × 140 mm are punched from the sheets manufactured in this way with the aid of a punch tool.

The test specimens are suspended from a steel loop and aged in a circulating air oven at 120°C. After the end of an induction time which is typical of the additive the degraded material drips off; the results are given in days.

| Stabiliser No. | Days to reach incipient dripping, at 120°C |
|---|---|
| Without stabiliser | 6 |
| 6 | 10 |
| 15 | 14 |
| 19 | 11 |
| 24 | 12 |
| 26 | 11 |
| 28 | 10 |
| 31 | 13 |
| 36 | 13 |
| 37 | Comparison product 7 |

I claim:
1. A compound of the formula

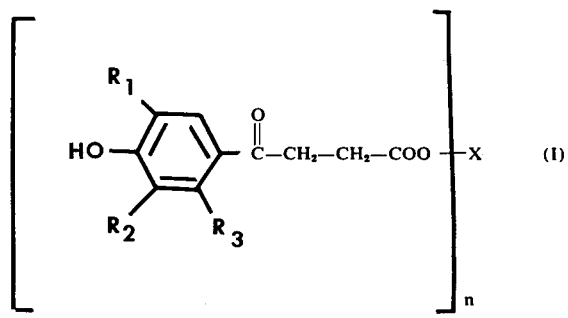

in which $R_1$ and $R_2$ independently of one another are a primary or secondary alkyl group with 1–5 carbon atoms or a cycloalkyl group with 6–8 carbon atoms, $R_3$ is hydrogen or methyl, and X is a straight chain, branched or cyclic alkyl group with 1–18 carbon atoms, aralkyl with 7–9 carbon atoms, thiaalkyl with 3–20 carbon atoms, the oxygen of the carboxyl group in the Formula I being bonded to a carbon atom in the thiaalkyl radical which carries no further hetero-atoms, alkylene with 2–18 carbon atoms, oxaalkylene with 4–18 carbon atoms with the oxygen of the carboxyl group in the Formula I being bonded to a carbon atom in the oxaalkylene which does not carry any further hetero-atoms, thiaalkylene with 4–18 carbon atoms, with the oxygen of the carboxyl group in the Formula I being bonded to a carbon atom in the thiaalkylene which does not carry any further hetero-atoms, or a 3-valent hydrocarbon radical with 3–10 carbon atoms, with not more than one bond to the carboxyl groups leading from one and the same carbon atom, or a 4-valent hydrocarbon radical with 4–10 carbon atoms, with not more than one bond to the carboxyl groups leading from the same carbon atom, or a group

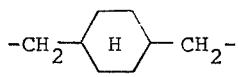

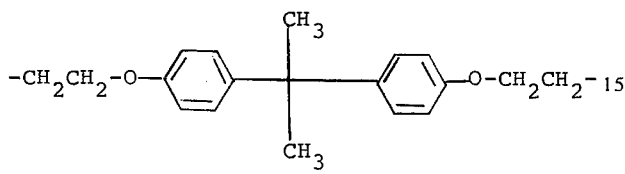

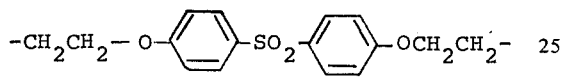

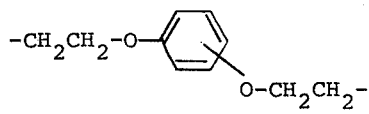

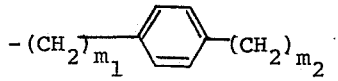

wherein $m_1$ and $m_2$ are 1, 2 or 3, and $n$ is 1, 2, 3 or 4.

2. A compound of claim 1 of the formula I, in which $R_1$ and $R_2$ independently of one another are a primary or secondary alkyl group with 1–4 carbon atoms, $R_3$ is hydrogen, X is a straight-chain, branched or cyclic alkyl group with 1–18 carbon atoms, aralkyl with 7–9 carbon atoms, thiaalkyl with 3–20 carbon atoms, with the oxygen of the carboxyl group being bonded to a carbon atom in the thiaalkyl which does not carry any further hetero-atoms, alkylene with 2–18 carbon atoms, or thiaalkylene with 4–18 carbon atoms, with the oxygen of the carboxyl group being bonded to a carbon atom in the thiaalkylene which does not carry any further hetero-atoms, and $n$ is 1 or 2.

3. A compound of claim 1 of the formula I, in which $R_1$ and $R_2$ are a primary or secondary alkyl group with 1–4 carbon atoms, $R_3$ is hydrogen, X is a straight-chain, branched or cyclic alkyl group with 1 to 18 carbon atoms, thiaalkyl with 4 to 14 carbon atoms or alkylene with 5 or 6 carbon atoms and $n$ is 1 or 2.

4. Compound according to claim 1, of the formula

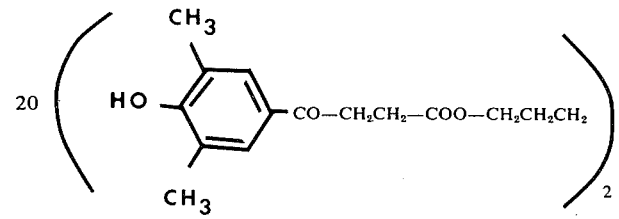

5. Compound according to claim 1, of the formula

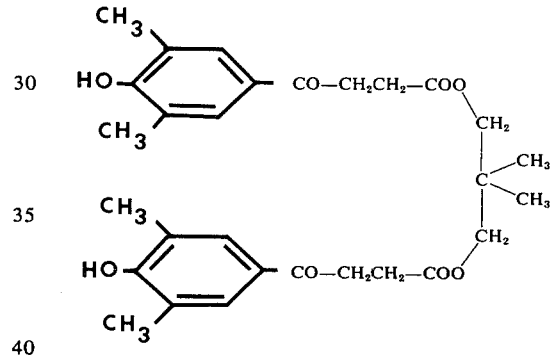

6. Compound according to claim 1, of the formula

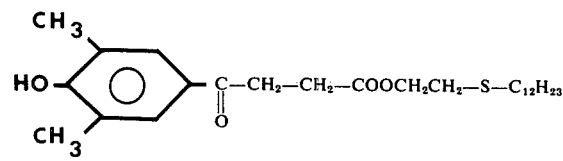

* * * * *